(No Model.) 2 Sheets—Sheet 1.

G. MOORE.
DEVICE FOR ATTACHING COLTERS TO PLOW BEAMS.

No. 427,102. Patented May 6, 1890.

Witnesses:
Albert H. Adams.
Harry T. Jones.

Inventor:
Gilpin Moore
By West & Bond Attys

THE NORRIS PETERS CO., PHOTO-LITHO., WASHINGTON, D. C.

(No Model.) 2 Sheets—Sheet 2.

G. MOORE.
DEVICE FOR ATTACHING COLTERS TO PLOW BEAMS.

No. 427,102. Patented May 6, 1890.

Witnesses: Albert H. Adams. Harry T. Jones.

Inventor: Gilpin Moore By West + Bond Attys

UNITED STATES PATENT OFFICE.

GILPIN MOORE, OF MOLINE, ILLINOIS, ASSIGNOR TO DEERE & COMPANY, OF SAME PLACE.

DEVICE FOR ATTACHING COLTERS TO PLOW-BEAMS.

SPECIFICATION forming part of Letters Patent No. 427,102, dated May 6, 1890.

Application filed January 20, 1890. Serial No. 337,486. (No model.)

*To all whom it may concern:*

Be it known that I, GILPIN MOORE, residing at Moline, in the county of Rock Island, State of Illinois, and a citizen of the United States, have invented a new and useful Improvement in Devices for Attaching Colters to Plow-Beams, of which the following is a specification, reference being had to the accompanying drawings, in which—

Figure 1:
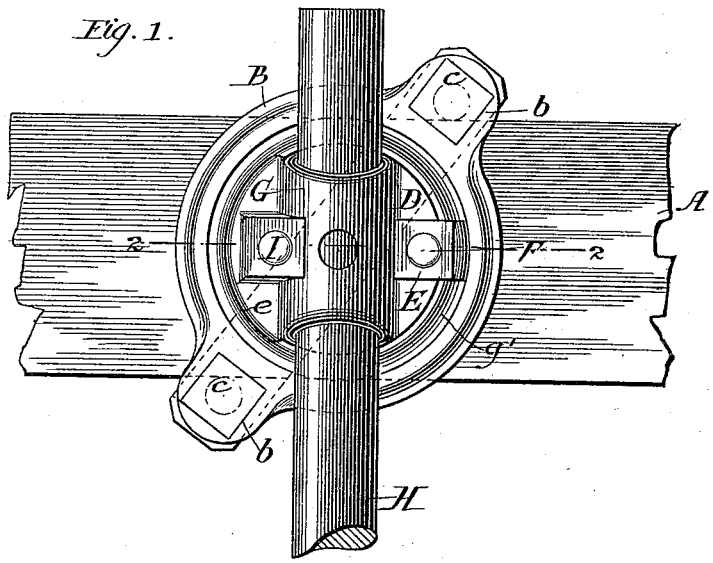
Figure 2:
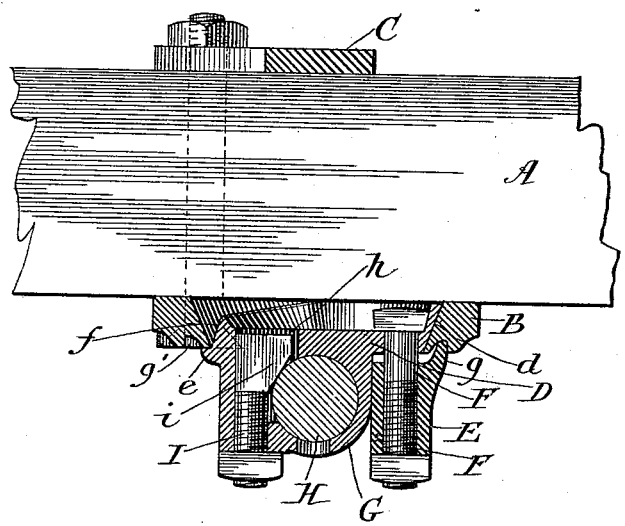
Figure 3:
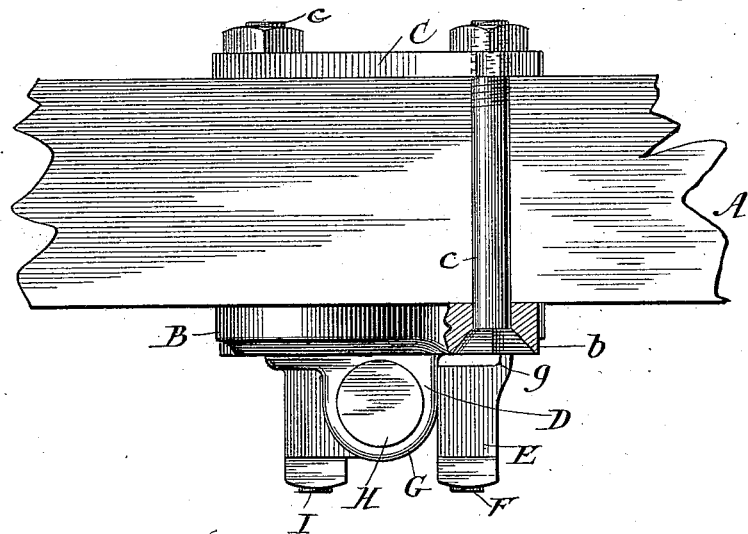
Figure 4:
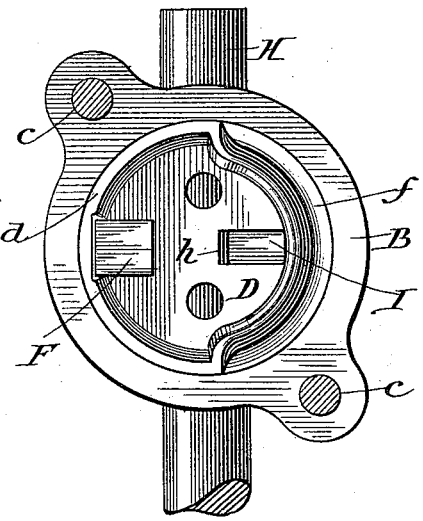
Figure 5:
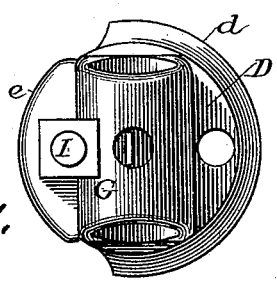

Figure 1 is a side elevation. Fig. 2 is a horizontal section at line 2 2 of Fig. 1. Fig. 3 is a top view, the upper edge of the plate being broken out; and Fig. 4 is a rear view of the clamp-plate and rotatable disk. Fig. 5 is a detail showing the rotatable disk.

The leading object of my invention is to provide an improved device for attaching colters to plow-beams by which the colter can be readily adjusted in a vertical plane and firmly held in the adjusted position, which I accomplish as illustrated in the drawings, and as hereinafter described.

That which I claim as new will be pointed out in the claims.

In the drawings, A represents a plow-beam.

B is a plate having a circular opening. The interior edge of the plate B is beveled, as shown in Fig. 2, making the circular opening tapered or of greater diameter at the inner than at the outer face of the plate B. This plate B is clamped against the side of a plow-beam A by two bolts *c*, one above and one below the plow-beam A, and a cross-bar C on the opposite side of the plow-beam A. The holes *b* in the plate or in ears or extensions of the plate B are countersunk, as shown in Fig. 3, to receive the heads of the bolts *c*, for the purpose hereinafter set forth.

D is a disk located and fitting within the circular opening in the plate B.

As shown in Figs. 2, 4, and 5, a portion *d* of the periphery of the disk D is beveled to correspond with and bear against the beveled edge of the plate B, and the remaining portion *f* is cut away. The portion *d* of the periphery of the disk D which is beveled may be decreased somewhat, or it may be extended to the entire or almost entire periphery. A flange *e* is provided on the disk D in front of the cut-away portion *f* to engage with the outer edge of the plate B, as shown in Fig. 2.

The portion *f* of the disk D is cut away to permit the disk to be readily inserted in position with the flange *e* resting against the front of the plate B.

E is a gib. This gib E is secured on the rotatable disk D by a bolt F, which passes through both the disk and the gib, as shown in Fig. 2, and it engages with the plate B, as shown in Figs. 1 and 2. It may have a projection *g* to engage with the plate B in an annular groove *g'*, and, if desired, the projection *g* on the bottom of the groove *g'* may be toothed. As shown, the portion *d* forms a bearing-surface on the disk D, which is clamped against the beveled edge or bearing-surface of the plate B by the gib E.

G is a socket to receive a colter-shank H, which socket, as shown, is integral with the disk D. This socket G is provided with a recess or opening *h* at one side and in rear of the opening for the shank H, as shown in Fig. 2.

I is a key-bolt located in the recess or opening *h*. The wedge-shaped head *i* of this bolt engages with the shank H and clamps it in the socket G, when the nut on the bolt is tightened. When it is desired to adjust the shank H longitudinally in the socket G, the nut on the bolt I is loosened, when the shank H can be adjusted as desired, and the nut can then be again tightened and firmly clamp the shank in its adjusted position.

The rotatable disk D, which supports the socket G, is held against rotation in the circular opening in the plate B by the gib E, which bears against the plate B and draws the bearing surface or portion *d* of the disk against the beveled edge or bearing-surface of the plate B, thereby firmly clamping the rotatable disk to the fixed or clamped plate B.

When it is desired to adjust the colter-shank in a vertical plane, the bolt F is loosened, thereby permitting the disk D to be readily turned or rotated in the circular opening in the plate B to bring the shank H into the desired position, when the bolt can again be tightened and firmly secure the disk D in its adjusted position. The plate B remains fixed or stationary at all times. It is evident that all that is necessary to adjust the colter-shank in a vertical plane is to loosen the clamping device and rotate the disk D as desired, and again tighten the clamping device, the disk D being free from the plow-beam and free to rotate in the circular opening in the plate B when the clamping device is loosened. The flange e aids in keeping the rotatable disk D in proper position on the plate B.

The holes b in the plate or extensions of the plate B are countersunk to receive the heads of the attaching-bolts c, so that the heads will not project beyond the face of the plate B, thereby permitting the shank of the colter to be supported on the disk D close to the face of the plate B, and to swing in a vertical plane when the disk D is rotated for adjustment.

The ears or extensions of the plate B, through which the bolts c pass, may be set back of the face of the main portion of the plate in which the disk rotates instead of being countersunk and common machine bolts used, the essential feature being that the heads of the bolts c be back of the vertical plane of swing or rotation of the shank H, so as not to interfere with its swing in such plane.

The device is primarily designed for attaching colters to plow-beams; but it is evident that other devices—such as a jointer or wheel or a cultivator or plow-standard—may be secured upon the shank H, the office and operation of the device in such cases being the same.

By the use of the cross-bar C and bolts c, or equivalent device, the plate B may be secured to any plow-beam in the proper position for attaching the colter.

What I claim as new, and desire to secure by Letters Patent, is—

1. In a device for attaching colters or other standards, the combination, with a fixed plate, having a circular opening, of a disk rotatable on said plate, a clamping device for clamping the rotatable disk to the fixed plate, and a shank supported upon said disk, substantially as and for the purpose specified.

2. In a device for attaching colter or other standards, the combination, with a plate having a circular opening and means for securing the plate to a plow-beam, of a rotatable disk having a bearing-surface engaging with said plate, a gib for clamping the disk against rotation, bolt I, and a colter-shank supported on said disk, substantially as and for the purpose specified.

3. In a device for attaching colter or other standards, the combination, with a supporting-disk and a socket thereon having a recess h, of a shank passing through the socket, and a tightening-bolt having a wedge-shaped head in said recess to engage with the shank, substantially as specified.

4. In a device for attaching colter or other standards, the combination, with a plate B, having holes b, and a rotatable disk supported thereon and carrying a shank H, of attaching-bolts c, passing through the holes b, and having their heads back of the vertical plane of the swinging shank, substantially as and for the purpose specified.

5. In a device for attaching colters, the combination, with a fixed plate, of a rotatable disk, a socket thereon, a key-bolt I, a shank H, and a gib for clamping the disk and plate together, substantially as specified.

GILPIN MOORE.

Witnesses:
J. T. FRANCIS,
C. H. POPE.